United States Patent [19]

Wang et al.

[11] Patent Number: 5,765,027

[45] Date of Patent: Jun. 9, 1998

[54] NETWORK CONTROLLER WHICH ENABLES THE LOCAL PROCESSOR TO HAVE GREATER ACCESS TO AT LEAST ONE MEMORY DEVICE THAN THE HOST COMPUTER IN RESPONSE TO A CONTROL SIGNAL

[75] Inventors: Jerry Borjeng Wang, Lake Forest; Robert Vernon Harper, Torrance; Chih-Chung Shi, Yorba Linda, all of Calif.

[73] Assignee: Toshiba American Information Systems, Inc., Irvine, Calif.

[21] Appl. No.: 310,298

[22] Filed: Sep. 26, 1994

[51] Int. Cl.$^6$ .................................................. G06F 13/00

[52] U.S. Cl. ............... 395/860; 395/200.45; 395/200.59; 395/882; 395/836

[58] Field of Search ............... 340/825.05; 360/69; 395/293, 500, 297, 200.43, 200.59, 860, 882; 380/3; 439/61

[56] References Cited

U.S. PATENT DOCUMENTS

| | | | |
|---|---|---|---|
| 4,500,933 | 2/1985 | Chan | 360/69 |
| 4,803,485 | 2/1989 | Rypinski | 340/825.05 |
| 4,811,205 | 3/1989 | Normington et al. | 345/502 |
| 4,899,306 | 2/1990 | Greer | 395/500 |

(List continued on next page.)

OTHER PUBLICATIONS

"Wireless Data Networks and the Mobile Workforce", Ira Brodsky, *Telecommunications*, Dec. 1990, vol. 24, No. 12, p. 31.

"The Engineering Monthly Index", May 1992, p. 277, abstract of Cordless LANs Hit the Airwaves, Ira Brodsky, Telecommunications, Sep. 1991, v. 25, No. 9, 5p.

"Wireless LANs Duel in Europe", Elizabeth Heichler, *Electronic News*, Apr. 25, 1994, p. 30.

"PCMCIA Cards on Deck; Personal Computer Memory Card International Association Cards at Comdex/Fall 1993 Trade Show," Tammi Harbert, *PC Week*, Nov. 15, 1993, v. 10, No. 5, p. 108.

"Surge in Popularity Spans New Ideas for Wireless LANS," Morris Edwards, *Communication News*, v. 31, No. 8, p. 55, Aug. 1994.

*Primary Examiner*—Thomas C. Lee
*Assistant Examiner*—Po C. Huang
*Attorney, Agent, or Firm*—Banner & Witcoff, Ltd.

[57] ABSTRACT

An application specific integrated circuit (ASIC)/field programmable gate array (FPGA) which is a component of a wireless LAN controller including a local processor and a memory enables the controller to interface with both PCMCIA™ and AT™ host computer systems. The ASIC/FPGA enables communication between a radio frequency communication module, a local processor, and the host computer. The ASIC/FPGA also includes a throttle feature that decreases the access of the host computer in comparison to access of the local processor in order to enable the local processor to rapidly generate an acknowledge signal as required by various RF LAN specifications. During operation of the controller, data to be transmitted by the host computer onto the network is written by the host to an SRAM via the ASIC/FPGA, and the host commands the local processor via the ASIC/FPGA to forward the transmitted data to the RF communication module. Under the control of the ASIC/FPGA, the local processor then forwards the transmit data from the SRAM to the RF communication module. When data is received from the RF communication module, the local processor, under the control of the ASIC/FPGA, receives the data and stores the received data in the SRAM. The received data is then forwarded to the host computer via the ASIC/FPGA.

28 Claims, 16 Drawing Sheets

U.S. PATENT DOCUMENTS

| | | | |
|---|---|---|---|
| 4,972,470 | 11/1990 | Farago | 380/3 |
| 5,043,938 | 8/1991 | Ebersole | 395/200.2 |
| 5,121,482 | 6/1992 | Patton | 395/836 |
| 5,159,684 | 10/1992 | Kroll et al. | 395/500 |
| 5,163,833 | 11/1992 | Olsen et al. | 439/61 |
| 5,183,404 | 2/1993 | Aldous et al. | 439/55 |
| 5,237,659 | 8/1993 | Takats | 395/200.02 |
| 5,241,632 | 8/1993 | O'Connell et al. | 395/297 |
| 5,301,303 | 4/1994 | Abraham et al. | 395/500 |
| 5,305,317 | 4/1994 | Szczepanek | 370/85.5 |
| 5,367,646 | 11/1994 | Pardillos et al. | 395/310 |
| 5,396,602 | 3/1995 | Amini et al. | 395/293 |
| 5,444,855 | 8/1995 | Thompson | 395/287 |
| 5,457,784 | 10/1995 | Wells et al. | 395/829 |
| 5,479,399 | 12/1995 | Grabenhorst et al. | 370/391 |
| 5,481,696 | 1/1996 | Lomp et al. | 395/500 |
| 5,598,542 | 1/1997 | Leung | 395/297 |

FIG. 12

| NAME | SOURCE | DESCRIPTION |
|---|---|---|
| A0-A25 | HOST | SIGNALS A0 THROUGH A25 ARE 26 ADDRESS BUS LINES CAPABLE OF ADDRESSING 64 MEGABYTES OF MEMORY ON THE CARD. A25 IS THE MOST SIGNIFICANT BIT. IN THE PCMCIA CARD, ONLY A0 THROUGH A12 ARE USED. |
| D0-D15 | HOST/ LOCAL | SIGNALS D0 THROUGH D15 CONSTITUTE THE BI-DIRECTIONAL DATA BUS. D15 IS THE MOST SIGNIFICANT BIT. |
| CE1/, CE2/ | HOST | THE CE1/ AND CE2/ ARE CARD-ENABLE SIGNALS. THE CE1/ ENABLES EVEN-NUMBERED-ADDRESS BYTES, CE2/ ENABLES ODD-NUMBERED-ADDRESS BYTES. |
| OE/ | HOST | THE OE/ LINE IS THE ACTIVE-LOW, INPUT SIGNAL USED TO GATE MEMORY READ DATA INTO THE PCMCIA CARD. |
| WE/ | HOST | THE WE/ INPUT SIGNAL IS USED FOR STROBING MEMORY WRITE DATA INTO THE PCMCIA CARD. |
| CD1/, CD2/ | LOCAL | THE CD1/ AND CD2/ SIGNALS PROVIDE FOR PROPER DETECTION OF CARD INSERTION. THE CD1/ AND CD2/ SIGNALS ARE CONNECTED TO GROUND INTERNALLY ON THE PCMCIA CARD. |
| REG/ | HOST | WHEN THE REG/ SIGNAL IS ACTIVE, ACCESS IS LIMITED TO ATTRIBUTE MEMORY AND I/O SPACE. REG/ SIGNAL IS KEPT INACTIVE FOR ALL COMMON MEMORY ACCESS. |
| RESET | HOST | THE RESET SIGNAL CLEARS THE CARD CONFIGURATION OPTION REGISTER THUS PLACING A CARD IN UNCONFIGURED STATE. THE HOST WILL ACTIVATE THIS SIGNAL AT THE BEGINNING OF ANY CARD INSERTION. |
| WAIT/ | LOCAL | THE WAIT SIGNAL IS ASSERTED BY A CARD TO DELAY COMPLETION OF THE MEMORY-ACCESS OR I/O-ACCESS CYCLE IN PROGRESS. |
| IREQ/ | LOCAL | THE INTERRUPT REQUEST (IREQ/) SIGNAL IS ASSERTED TO INDICATE THE NEED OF THE HOST SOFTWARE SERVICE. IT'S AVAILABLE ONLY WHEN THE CARD AND THE INTERFACE ARE CONFIGURED FOR THE I/O INTERFACE. THE IREQ/ CAN BE EITHER LEVEL OR PULSE MODE. |
| IORD/ | HOST | THE IORD/ SIGNAL IS MADE ACTIVE TO READ DATA FROM THE CARD'S I/O SPACE. THE REG/ SIGNAL AND AT LEAST ONE OF CE1/ OR CE2/ MUST ALSO BE ACTIVE FOR THE I/O TRANSFER TO TAKE PLACE. |
| IOWR/ | HOST | THE IOWR/ SIGNAL IS MADE ACTIVE TO WRITE DATA TO THE CARD'S I/O SPACE. THE REG/ SIGNAL AND AT LEAST ON OF CE1/ OR CE2/ MUST ALSO BE ACTIVE FOR THE I/O TRANSFER TO TAKE PLACE. |
| INPACK/ | LOCAL | THE INPACK/ SIGNAL IS ASSERTED WHEN THE PCMCIA CARD'S I/O SPACE IS SELECTED. THIS SIGNAL IS USED TO CONTROL THE ENABLE OF ANY INPUT DATA BUFFER. |
| VCC, GND | HOST | TWO VCC AND FOUR GND PINS ARE EMPLOYED TO REDUCE THE IMPEDANCE BETWEEN THE PCMCIA CARD AND THE SYSTEM. |

FIG. 13

| NAME | SOURCE | DESCRIPTION |
|---|---|---|
| SA0-SA19 | HOST | SIGNALS SA0 THROUGH SA19 ARE 20 ADDRESS BUS LINES CAPABLE OF ADDRESSING 1 MEGABYTES OF MEMORY ON THE CARD. SA19 IS THE MOST SIGNIFICANT BIT. |
| SD0-SD15 | HOST/LOCAL | SIGNALS SD0 THROUGH SD15 CONSTITUTE THE BI-DIRECTIONAL DATA BUS. D15 IS THE MOST SIGNIFICANT BIT. |
| LA17-LA23 | HOST | SIGNALS LA17 THROUGH LA23 ARE 7 UNLATCHED ADDRESS BUS LINES. |
| AEN | HOST | ADDRESS ENABLE FOR I/O ADDRESS DECODING. WHEN HIGH, ALL ISA BUS ADDRESS, DATA AND COMMAND LINES ARE CONTROLLED BY THE DIRECT MEMORY ACCESS (DMA). |
| BALE | HOST | BUS ADDRESS LATCH ENABLE INDICATES WHEN THE HOST CPU HAS A VALID ADDRESS ON THE ISA BUS. |
| IOCHRDY | LOCAL | THE READY SIGNAL TO THE HOST TO INDICATE THAT THE AT CARD IS READY TO WRITE OF READ DATA FROM THE HOST CPU. |
| IORD/ | HOST | THIS IS THE I/O READ SIGNAL. |
| IOWR/ | HOST | THIS IS THE I/O WRITE SIGNAL. |
| IRQ3-4, 7, 9-12, 15 | LOCAL | THE INTERRUPT REQUEST (IRQ) SIGNALS ARE ASSERTED TO INDICATE THE NEED OF THE HOST SOFTWARE SERVICE. |
| MEMCS16/ | LOCAL | THE MEMORY 16-BIT CHIP SELECT FOR A 16-BIT, 1 WAIT STATE MEMORY CYCLE. |
| SBHE/ | HOST | SYSTEM BUS HIGH ENABLE INDICATES A 16-BIT TRANSFER OF DATA. |
| SMEMR/ | HOST | THIS IS THE MEMORY READ SIGNAL. |
| SMEMW/ | HOST | THIS IS THE MEMORY WRITE SIGNAL. |
| RESET | HOST | THE RESET SIGNAL IS USED TO RESET OR INITIALIZE THE AT CARD LOGICS AFTER POWER UP. |
| +5V, GND | HOST | TWO VCC AND FOUR GND PINS ARE EMPLOYED TO REDUCE THE IMPEDANCE BETWEEN THE AT CARD AND THE SYSTEM. |

FIG. 14

| NAME | SOURCE | DESCRIPTION |
|---|---|---|
| MMI_CLK | RF | THIS 5 MHz CLOCK IS PART OF MODEM MANAGEMENT INTERFACE (MMI). THIS SIGNAL GOES INTO FPGA TO CLOCK THE DATA OUT THROUGH THE MMI_SIO LINES. |
| MMI_SIO | RF/ LOCAL | SERIALIZED I/O DATA IS PART OF MODEM MANAGEMENT INTERFACE (MMI). THE SIGNAL IS ACTIVE LOW AND, WHEN IN COMBINATION WITH MMI_CLK, USED FOR SENDING COMMAND TO AND RECEIVING STATUS FROM THE RF MODULE. |
| MME | LOCAL | MODEM MANAGEMENT ENABLE (MME) IS AN ACTIVE HIGH SIGNAL. WHEN ACTIVE MME WILL ENABLE THE MODEM MANAGEMENT INTERFACE (MMI). THIS SIGNAL IS GENERATED AUTOMATICALLY BY FPGA/ASIC DURING MMI REGISTER ACCESS. IT IS DISABLED DURING LOOPBACK TEST MODE. |
| TXC/ | RF | THIS IS A 2 MHz CLOCK FOR RF TRANSMITTER. THIS SIGNAL IS CONNECTED TO BOTH TCLK1 AND TCLK2 OF 68302 PORT 1 AND PORT 2. |
| RXC/ | RF | THIS IS A 2 MHz CLOCK FOR RF RECEIVER. THIS SIGNAL IS CONNECTED TO BOTH RCLK1 AND RCLK2 OF 68302 PORT 1 AND PORT 2. |
| TXD | LOCAL | TRANSMIT DATA (TXD) IS AN ACTIVE HIGH SIGNAL. THE LOCAL PROCESSOR WILL CLOCK THE DATA OUT VIA THIS LINE USING TXC/ WHEN CTS/ IS ACTIVE. THIS SIGNAL IS THE OR OUTPUT OF TXD1/ OR TXD2/ OF 68302. |
| RXD | RF | RECEIVE DATA (RXD) IS AN ACTIVE HIGH SIGNAL. THE LOCAL PROCESSOR WILL CLOCK DATA IN VIA THIS LINE USING RXC/ WHEN CRS/ IS ACTIVE. THIS SIGNAL IS CONNECTED TO BOTH RXD1 AND RXD2 OF 68302. |
| RTS/ | LOCAL | REQUEST TO SEND (RTS/) IS AN ACTIVE LOW SIGNAL. THIS SIGNAL IS THE OR OUTPUT OF RTS1/ OR RTS2/ OF 68302. |
| CTS/ | RF | CLEAR TO SEND (CTS/) IS AN ACTIVE LOW SIGNAL. THIS SIGNAL IS MONITORED BY FPGA/ASIC TO CREATE CTS302/ WHICH IS THEN CONNECTED TO BOTH CTS1/ AND CTS2/ OF 68302 AT PORT 1 AND PORT 2. |
| CRS/ | RF | CARRIER SENSE, ACTIVE LOW. CRS/ BECOMES ACTIVE WHEN THE RF MODULE IS RECEIVING A MESSAGE WITH CORRECT NETWORK ID. CRS/ IS GENERATED ON THE RISING EDGE OF RXC_. THIS SIGNAL IS INVERTED BEFORE CONNECTED TO PB10 OF 68302 TO GENERATE INTERRUPT. THIS SIGNAL ALSO CONNECTS TO BOTH CD1/ AND CD2/ OF 68302 PORT 1 AND PORT 2. |
| CDT/ | RF | COLLISION DETECT (CDT/) IS AN ACTIVE LOW SIGNAL. THIS SIGNAL CONNECTED TO PB11 OF 68302. |
| PWR_DWN | LOCAL | THIS ACTIVE HIGH SIGNAL WHEN ASSERTED WILL PUT THE RF MODULE INTO SLEEP MODE TO CONSERVE POWER. THIS SIGNAL IS CONNECTED TO PA10 OF 68302. |
| SYS_RES | LOCAL | THIS ACTIVE HIGH SIGNAL WHEN ASSERTED WILL PUT THE RF INTO RESET STATE. THIS SIGNAL IS CONTROLLED THROUGH PA11 OF 68302. |
| +5V, +12V, -12V, GND | LOCAL | +12V AND -12V ARE ONLY REQUIRED FOR 34-PIN RF MODULE. THE +5V IS REQUIRED FOR BOTH TYPES OF RF MODULES. | ically-specific integrated circuit/field-
NETWORK CONTROLLER WHICH ENABLES THE LOCAL PROCESSOR TO HAVE GREATER ACCESS TO AT LEAST ONE MEMORY DEVICE THAN THE HOST COMPUTER IN RESPONSE TO A CONTROL SIGNAL

BACKGROUND OF THE INVENTION

The present invention relates to an integrated circuit/field-programmable gate array for use in a wireless radio frequency local area network (LAN) controller which enables a PCMCIA™ or AT™ host computer to communicate within the LAN.

To meet the demand for new and efficient methods of communication, many types of local area networks (LANs) have been developed such as optical LANs (e.g., FDDI networks) and LANs in which users communicate via modem over telephone lines (e.g., Echoplex networks). However, the increasing popularity of portable personal computers, also known as laptop or notebook computers, has created a demand for LANs that can be accessed from these portable computers without requiring the computer to be in some way hardwired to the network, thus allowing for fully portable network access. As a result, wireless LANs such as radio frequency (RF) LANs have been developed in which packets of information including address information and data are transmitted wirelessly using radio frequency technology.

The increasing popularity of portable personal computers has also fueled the need for small, lightweight, portable expansion devices which take the form of memory cards. As a result, many manufacturers began to produce memory cards of various sizes and capabilities, creating the need for an industry standard.

The Personal Computer Memory Card International Association (PCMCIA) was founded in 1989 and created the first standard (1.0) for memory cards. Since that time, the PCMCIA has also released standard 2.1 which includes support not only for memory, but also for I/O devices, comprehensive software architecture, and other changes. In general, PCMCIA cards include RAM, Flash memory and other types of ROM. I/O devices include voice, data and fax modems; network interface cards; and wireless communications. There are three sizes of PCMCIA cards: type I which are used for memory devices; type II which are used for modems, LANs, etc.; and type III which are used for devices such as ATA hard drives whose miniaturization technology is not as advanced.

However, while PCMCIA technology is rapidly advancing, a large number of desktop computers are still in use. These computers have an IBM™ AT™-type architecture and use a standard ISA bus that is different from the bus used in PCMCIA systems.

As a result of the mixture of computer systems that are widely used, it is desirable to create software/firmware that is capable of interfacing with both PCMCIA and AT systems. Thus, it is desirable to create a controller that enables either type of host system to access a wireless local area network.

A number of controllers for accessing local area networks are known. For example, U.S. Pat. 5,237,659 discloses a gateway device which provides a link between a host module and an optical fiber token-ring network (e.g., an FDDI network). The gateway device includes a controller that manages the transfer of frames between the host module and the network and having a control bus that carries control blocks coming to and from the host module and control characters of the FDDI frames coming to or from the storage memory. The controller interprets the control blocks to form control characters and forms control blocks from control characters.

Also, U.S. Pat. No. 5,159,684 discloses a data communication interface integrated circuit with data-echoing and non-echoing communication modes which converts parallel data of a host module to serial data for transmission, e.g. in an Echoplex protocol or RS-232 protocol communication system via a telephone line, and translates received serial data into parallel data readable by the host module.

However, these references do not disclose a controller for interfacing with a radio frequency local area network that is compatible with host computers having a portable or a desktop (e.g., a PCMCIA or AT) architecture.

SUMMARY OF THE INVENTION

The present invention relates to an apparatus and method for an application-specific integrated circuit/field-programmable gate array (ASIC/FPGA) that will enable both host computers having a PCMCIA architecture and host computers having an AT architecture to communicate in a wireless radio frequency local area network. Embodiments of the present invention further relate to a design for a controller which enables a host computer having either a PCMCIA™ or an AT™ architecture to communicate in a wireless local area network.

A wireless LAN controller, according to embodiments of the present invention, includes a host interface for interfacing with a host computer having a desktop or a portable computer architecture; a network interface for interfacing with a network communication module; a local processor; and a first communication circuit for enabling communication between the host computer, the network interface, and the local processor. The first communication circuit includes a circuit for communicating with the host computer via the host interface, a second communication circuit for communicating with the network communication module via the network interface, a third communication circuit for communicating with the local processor, a desktop interpretation circuit for receiving and interpreting information from the host computer when the host computer has a desktop architecture, and a portable interpretation circuit for receiving and interpreting information from the host computer when the host computer has a portable architecture.

In another embodiment of the controller according to the present invention, the local processor is located within the first communication circuit.

An ASIC/FPGA according to the present invention includes a circuit for receiving control signals and/or data from a host computer having a desktop computer architecture via a host interface; a circuit for receiving control signals and/or data from a host computer having a portable computer architecture via the host interface; a transmitter for transmitting control signals and/or data to the host computer via the host interface; a circuit for receiving control signals and/or data from a network communication module via a module interface; a transmitter for transmitting control signals and/or data to the network communication module via the module interface; a circuit for receiving control signals and/or data from a local processor; and a transmitter for transmitting control signals and/or data to the local processor.

Another ASIC/FPGA according to the present invention includes a circuit for receiving control signals and/or data from a host computer via a host interface; a transmitter for transmitting control signals and/or data to the host computer via the host interface; a circuit for receiving control signals and/or data from a network communication module via a network interface; a transmitter for transmitting control signals and/or data to the network communication module via the network interface; a circuit for receiving control signals and/or data from a local processor; a transmitter for transmitting control signals and/or data to the local processor; and a throttle circuit for enabling the local processor to have greater access to a memory within the controller than the host computer in response to a throttle signal.

A method of enabling communication between a host computer having a desktop or a portable architecture and a local area network via a controller according to the present invention includes the steps of transmitting identification data from a host computer via a host interface to a controller, the identification data identifying the architecture of the host computer, and thereby configuring the controller; writing data to be transmitted from the host computer onto a network to the controller; forwarding the data to be transmitted from the controller to a network communication module via a network interface; and transmitting the data to be transmitted onto the network.

The foregoing and other features, aspects, and advantages of the present invention will become more apparent from the following detailed description when read in conjunction with the accompanying drawings.

BRIEF DESCRIPTION OF THE DRAWINGS

FIG. 12 provides a diagram of the PCMCIA/host interface signals.

FIG. 13 provides a diagram of the AT/host interface signals.

FIG. 14 provides a diagram of the RF interface signals.

DETAILED DESCRIPTION

The data communication interface integrated circuit for a wireless local area network (LAN) controller and a wireless LAN controller according to the present invention will now be described with reference to the drawings.

Figure 1:
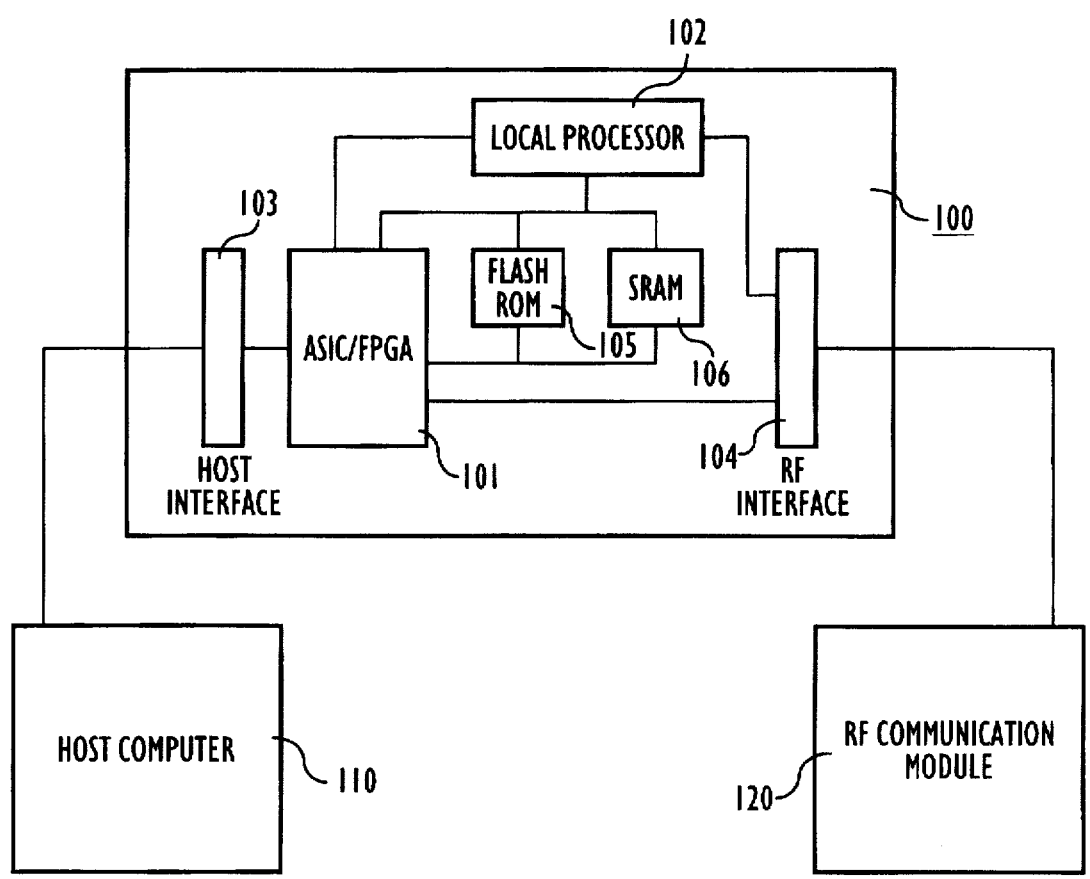
FIG. 1 provides a system level block diagram of the controller or card, including an ASIC/FPGA, a local processor, a host interface, an RF interface, an SRAM and a FLASH ROM.

As illustrated in FIG. 1, a wireless local area network controller is shown as an adapter card 100 which can be for a desktop or a portable host computer. In the embodiments described below, adapter card 100 is particularly (though not exclusively) contemplated to be either a PCMCIA card or an AT card, having a number of components. The controller 100 comprises an application-specific integrated circuit (ASIC)/field-programmable gate array (FPGA) 101, a local processor 102, a host interface 103, a radio frequency interface 104, a FLASH ROM 105, and an SRAM 106. These components comprise the network controller 100 which enables a host computer 110 to interface with a wireless local area network, for example, a radio frequency local area network. The host interface 103 interfaces with the host computer 110. The radio frequency (RF) interface 104 interfaces with an RF communication module 120.

The ASIC/FPGA 101 is designed to include all control glue circuits on the controller 100. The SRAM 106 is a read/write communication buffer accessible by both the host and local processor. The FLASH ROM 105 is a program memory accessible by both the host computer 110 and the local processor 102. Writing to the FLASH ROM 105 may only be accomplished during a special program mode controlled by a mode register within ASIC/FPGA 101; however, reading from the FLASH ROM 105 is allowed at any time by both the host 110 and the local processor 102.

Briefly, operation of the wireless local area network controller according to the present invention is as follows. When data is to be transmitted by a host computer 110 on to the network, the host computer 110 writes the transmit data to the SRAM 106 via host interface 103 and ASIC/FPGA 101 and commands the local processor 102 via the ASIC/FPGA 101 to forward the transmitted data to the RF communication module 120 via the RF interface 104. Under the control of the ASIC/FPGA 101, the local processor 102 then forwards the transmit data from the SRAM 106 through the local processor 102 to the RF interface 104 and then to the RF communication module 120. When data is received from the RF communication module 120, the local processor 102 receives the data from the RF interface 104 and stores the received data in the SRAM 106. The local processor 102 also generates an acknowledge signal which is transmitted onto the network by the RF communication module 120 via RF interface 104. The received data is then forwarded to the host computer 110 via the ASIC/FPGA 101.

As a result, the ASIC/FPGA 101 enables communication between the host computer 110, the local processor 102, and the RF communication module 120. The ASIC/FPGA 101 enables transmission of control signals between these three components and controls host computer 110 and local processor 102 access to the SRAM 106 and the FLASH ROM 105.

The controller 100 according to the present invention includes both PCMCIA and AT form factors. When the controller 100 is coupled to a PCMCIA host computer 110, the controller 100 is referred to as a PCMCIA card. When the controller 100 is coupled to an AT host computer 110, the controller 100 is referred to as an AT card.

According to one embodiment of the present invention, the PCMCIA card is designed to comply with the PCMCIA 2.1 type II standard in a physical dimension of 85.6 mm×54.0 mm×5.0 mm. This card is designed to work with a radio frequency communication module 120 which is connected through a 15-wire serial interface cable. One possible RF communication module 120 is a PCMCIA 915 RF Modem manufactured by NCR Corporation of Dayton, Ohio. The PCMCIA card is also coupled to notebook computers through a standard 68-pin interface.

According to another embodiment of the present invention, the AT card has the same functionality as the PCMCIA card except that the host interface is a standard 16-bit ISA interface. The AT card may be coupled to an RF communication module 120, for example, an NCR WAVE-LAN™ modem, through a 15-wire serial interface cable or through a 34-pin wire interface for 2.4 GHz.

The components of the controller according to the present invention will now be described in detail.

Figure 2:
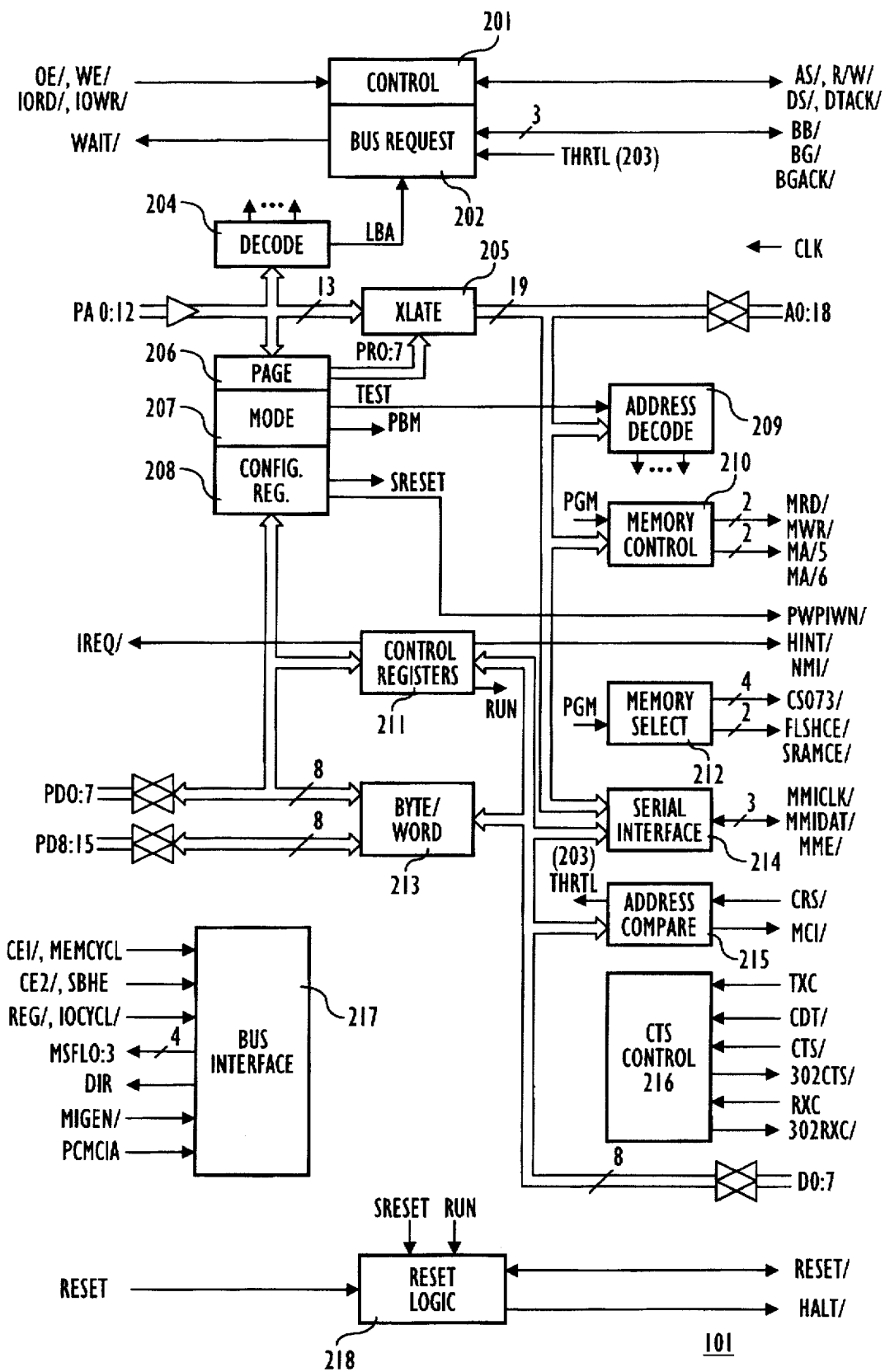
FIG. 2 provides a functional block diagram of the ASIC/FPGA according to the present invention.

FIG. 2 provides a functional block diagram of the ASIC/FPGA 101 shown in FIG. 1. The function block diagram shown in FIG. 2 is drawn to illustrate the host interface 103 between the ASIC/FPGA 101 and host computer 110 on the left-hand side of the figure and the interface between the ASIC/FPGA 101 and the local processor 102, the memories (the SRAM 106 and FLASH ROM 105) and the RF interface 104 on the right-hand side of the figure. As shown in FIG. 2, the ASIC/FPGA 101 contains a control module 201 which converts memory access control signals from the host computer 110 format to the local processor 102 format. Bus request module 202 generates bus arbitration handshaking signals when the host computer 110 is accessing the SRAM 106 and/or FLASH ROM 105. Bus request module 202 also assigns higher priority to the local processor 102 in response to a throttle (THRTL) signal 203 generated by the address compare module 215. The throttle feature will be discussed in detail below.

Figure 6:
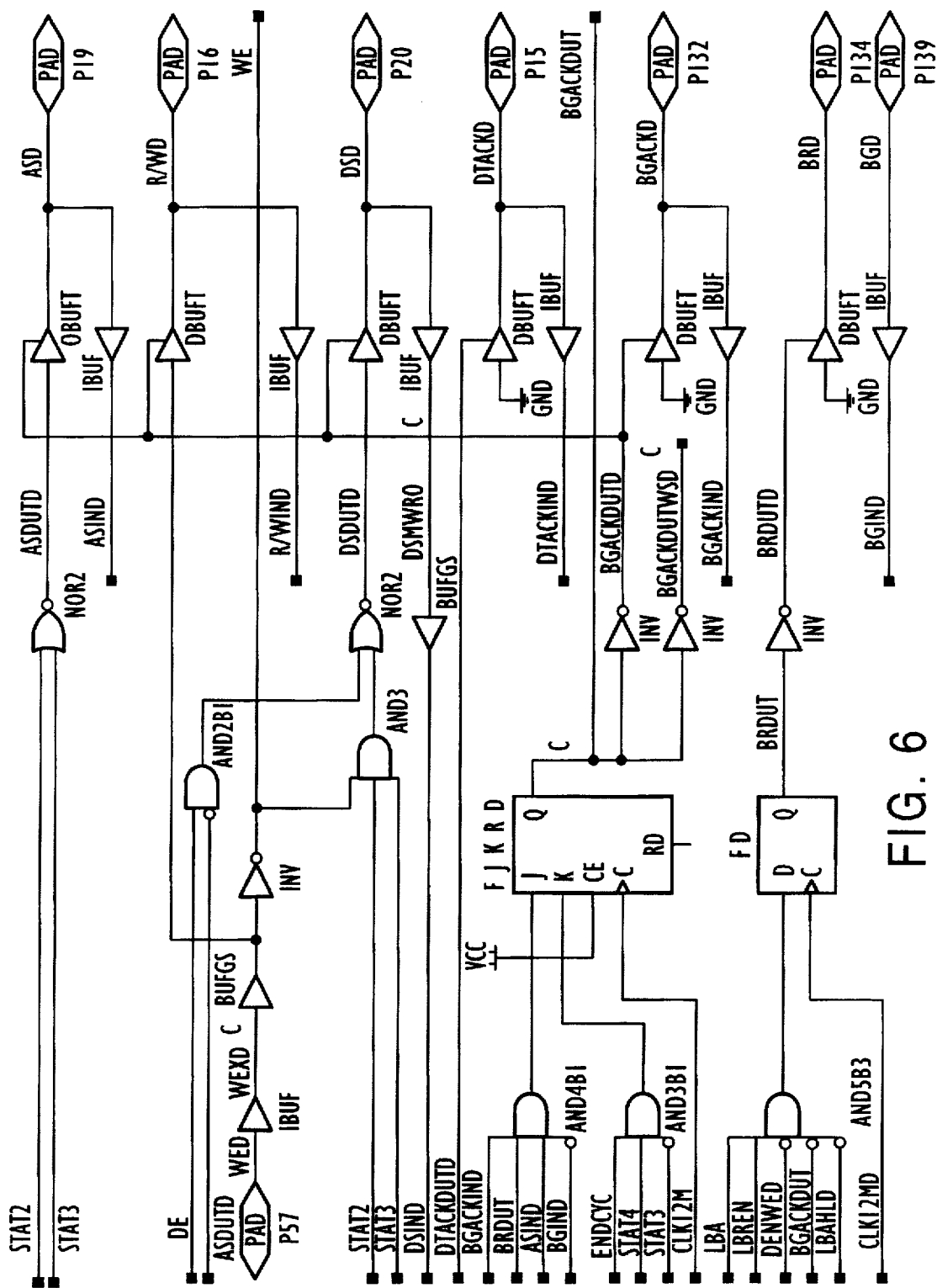
FIG. 6 provides a circuit schematic of the first part of the timing control circuit and the bus request used in the ASIC/FPGA according to the present invention.

The control module 201 and bus request module 202 also include a timing control circuit which synchronizes access to the FLASH ROM 105 and SRAM 106 by the host 110 and the local processor 102, both of which access these local memories. The timing control circuit as shown in FIG. 6 provides an optimal design which provides timing for the host to access the local memories 105 and 106. This timing control circuit operates once a bus request from the host 110 has been granted by bus request module 202.

The relationship of the throttle 203, the bus request module 202 and the timing control circuit of FIG. 6 is as follows. The throttle 203 affects the bus request module 202 by preventing the bus request module 202 from granting bus requests from the host 110 during periods when the local processor 102 has priority access to the local memories. Once the bus request module 202 has granted a bus request from the host 110, the timing control circuit then provides the timing for the host 110 to access the local memories 105 and 106.

The decode module 204 decodes address signals in host format for register access and memory access by the host 110. The decode module 204 tells the ASIC/FPGA 101 what the host 110 wants to access, for example the SRAM 106, the FLASH ROM 105, or a register in the ASIC/FPGA 101.

The translate (xlate) module 205 converts address signals in the host 110 format to local address signals in the local processor 102 format according to the contents of a page register 206 and the host address signals (designated as PA 0:12). The page register 206 is a register programmed by the host 110 for memory access paging.

The mode register 207 controls access to the FLASH ROM 105 by programming an arming sequence. The FLASH ROM 105 has two modes of operation: normal operation mode and programming operation mode. During normal operation mode a CIS (Card Information Structure) portion (not shown) of the FLASH ROM 105 is not writable by the host computer 110. However, during program mode the CIS portion of the FLASH ROM 105 which contains stored programs necessary to the ASIC/FPGA 101 is writable. To enable programming mode, the mode register 207 sends a program (PGM) signal to the memory control module 210 to enable programming mode of the FLASH ROM 105.

The CIS mentioned above contains information indicating the characteristics of the card 100 and how to access the card 100. This information is stored on the PCMCIA card prior to any other information and is read upon insertion of the card 100 in the host system. The system software uses this information to determine the appropriate actions to take once the card 100 is inserted.

The configuration registers 208 control the configuration of the ASIC/FPGA 101. The configuration registers 208 enable the host 110 to configure the controller to be compatible with PCMCIA architecture. The registers include certain bits that indicate the status of the configuration of the controller card 100.

The address decode module 209 enables the local processor to access the SRAM 106, the FLASH ROM 105, and the other registers (e.g., registers 206-208) within the ASIC/FPGA 101. The address decode module 209 decodes the address signals output from the translate module 205 in local processor format to enable accessing of the registers (e.g., registers 206-208), the SRAM 106, and the FLASH ROM 105. The memory control module 210 generates memory read or write enable signals for memory access in response to the address signals sent from translate module 205. Further, the memory control module 210 enables access to the CIS portion of the FLASH ROM in response to a program signal PGM generated by the mode register 207.

Memory control module 210 receives address commands from both the local processor 102 and the host 110. The commands received from the host 110 are processed in translate module 205 and loaded onto the local bus of local processor 102. In this way, the commands are provided to memory control module 210.

The control registers 211 indicate the status of the local processor 102 and provide an index of the last command loaded by the host 110 into the local processor 102. The control registers 211 include two registers, a status register (not shown) indicating to the host 110 the status of operation of the local processor 102, and a command register (not shown) which stores the last command provided to the local processor 102 by the host 110. The local processor accesses the command register and the host 110 accesses the status register.

The memory select module 212 generates enable signals for the SRAM 106 and for the FLASH ROM 105 indicating which memory is to be accessed. The byte/word module 213 converts sixteen bit data read off the 16-bit data bus of the host 110 into eight bits of data which can be loaded onto the 8-bit bus of the local processor 102. For example, bits of data (PD0:7 and PD8:15) to be written into the SRAM 106 are read from the host 110, divided into two segments of eight bits each, and loaded sequentially onto the 8-bit local processor 12 bus. The serial interface module 214 provides a serial communication interface between the local processor 102 and the RF communication module 120. The serial interface module 214 generates and receives control and status signals relating to the RF interface 104.

The address compare module 215 compares address information from packets of data received by the RF communication module 120 with the address of the host computer 110 to determine whether the packet on the network is addressed to the host computer 110. On receiving a data packet having an address matching that of the host 110, the address compare module 215 generates an interrupt signal (ACI/) and a throttle signal (THRTL). The throttle signal 203 is fed into bus request module 202 and, in response, the bus request module 202 allots priority of access to the local bus to the local processor 102. This alters the normal operation of the bus request module 202 which normally allots an equal amount of access to the local bus by the local processor 102 and the host 110. This "throttle" feature enables the local processor to generate an acknowledge signal quickly as required by some RF LAN specifications. The throttle circuit which generates the throttle signal and affects operation of the bus request circuit is located within bus request module 202 and address compare module 215 of FIG. 2.

Embodiments of the present invention (and environments thereof) contemplate that information from the wireless local area network, e.g., the RF network, can be continuously received by the RF communication module 120. This information can be received regardless of whether it is addressed to the host 110 such that the data can continue to come in as long as there is data being transmitted on the local area network. The data that is received by the RF communication module 120 contains an address at the front end of the RF data packet. The address is compared by the RF communication module 120 to determine whether or not the address of the packet being received matches the address of the host 110. When the address matches, the RF communication module 120 sends a carrier sense signal (CRS/) to the address compare module 215. In response, the address compare module generates a throttle signal 203 and a chip interrupt signal ACI/. Once the RF communication module 120 has downloaded the received data packet from the network, this information is passed through the RF interface 104 onto the local bus of local processor 102. Further, when the local processor 102 receives a signal indicating an address match, the local processor 102 generates an acknowledge packet that is passed through the RF interface into the RF communication module 120 under the control of ASIC/FPGA 101. The RF communication module 120 then transmits this acknowledge signal on the network.

In order to transmit data into the wireless local area network, the CTS control module 216 of the ASIC/FPGA 101 generates control signals which it provides to the local processor 102 and receives control signals from the RF communication module 120 via the RF interface 104. For example, the CTS control module 216 receives a collision detect signal CDT and clear to send signal CTS from the RF communication module 120. When the CTS control module 216 receives a collision detect signal it inhibits the clear to send signal to the local processor 102 by sending a signal 302 CTS to the RF communication module 120, thereby telling the RF communication module 120 not to transmit.

The bus interface module 217 receives and generates control signals in the host 110 format. The control signals received from the host 110 by bus interface 217 control the operation of the ASIC/FPGA 101. These signals enable the ASIC/FPGA 101 to operate when the host has a PCMCIA architecture and also when the host has an AT architecture. According to one embodiment, when the host has a PCMCIA architecture, the PCMCIA signal into bus interface module 217 is high indicating to the ASIC/FPGA that the host has a PCMCIA architecture. If the host has an AT architecture, the PCMCIA signal into bus interface module 217 is low.

When the host architecture is a PCMCIA architecture, the control signals by which the host 110 accesses the ASIC/FPGA and thus the local processor and the RF communication module 120 are those control signals which are entered into the bus interface module 217, for example, CE1, CE2. On the other hand, when the host 110 has an AT architecture, the host 110 controls the ASIC/FPGA with a combination of address signals, for example, the PAO address bit, as well as control signals entered into bus interface module 217. Otherwise stated, portions of the address from the host 110 to the local processor 102 are used as control commands when the host has an AT architecture. As a result, the ASIC/FPGA according to the present invention is capable of operating interchangeably with both PCMCIA architecture and AT architecture. This interchangeability feature is achieved without having to modify the structure of the ASIC/FPGA 101. Moreover, the ASIC/FPGA 101 identifies the architecture of the host computer 110 by determining the value (high or low) of the PCMCIA pin of bus interface 217. According to one embodiment, a high value of the PCMCIA pin identifies a PCMCIA host 110 and a low value indicates an AT host 110.

The reset logic module 218 generates reset control signals to reset the local processor 102 and the RF communication module 120 according in response to a RESET signal from the host computer 110.

The registers within ASIC/FPGA 101 will now be described in detail.

Control registers 211 include an access index register (AIR) (not shown) which is written by the host to provide the local processor 102 with an index to the host command that was previously loaded by the host. The host is able to read this register during a test mode. When the host writes to this register, a hardware interrupt signal (HINT/) is sent to the local processor 102. On detecting the HINT/ signal, the local processor 102 reads the AIR register which resets the HINT/ signal.

A second control register 211 is an access status register (ASR) (not shown) which is written by the local processor 102 to indicate the status of the firmware (the operating status of the local processor 102). This register is readable by the host 110. Further, a local interrupt register (LIR) (not shown) is written by the local processor 102 to set or reset the interrupt request signal (IREQ/) to the host computer 110.

Address compare registers 215 are provided to supplement the address compare capability of the local processor 102. The address compare registers 215 include an address compare interrupt control register (ACIC) (not shown) having a number of bits including a throttle enable bit, a data enable bit, an access point enable bit, a time enable bit, and a group reset bit.

The throttle function is enabled when a "1" is written to the throttle enable bit within the ACIC register. Once enabled, the throttle function slows the host access to the shared SRAM 106 for a predetermined period of time. Once the throttle function is enabled, activation and deactivation are completely controlled by the hardware. The throttle function allocates more time slots for the local processor when accessing the SRAM 106 and to improve response time from the local processor 102 so that, for example, the local processor 102 may generate an acknowledge signal to be transmitted in the RF network within the time required by various network specifications. When the throttle function is not enabled, the ratio of host time slots to local processor time slots is 1:1. When the throttle function is enabled, the ratio of host time slots to local processor time slots is, for example, 1:4. The duration of the throttle function is, for example, 128 microseconds, during which the host access rate is restricted to a maximum of 500K accesses/second. This feature is implemented by extending the PCMCIA interface signal WAIT/ or the AT interface signal IOCHRDY to limit the host access rate to the SRAM 106.

The data enable, access point enable, and time enable bits within the ACIC register enable an interrupt signal (ACI/) to the local processor if certain other bits within the register are high, for example, the data status bit, the access point status bit, or the time status bit, which indicate the status of certain bits within the last frame received from the RF communication module 120. The group reset bit resets portions of the ACIC register.

The host interface 103, as contemplated by various embodiments of the present invention, may be, for example, a PCMCIA/host interface or an AT host (having a standard ISA bus) interface. The ASIC/FPGA 101 is designed to enable communication between all of the adapter 100 components (the local processor 102, the RF communication module 120 via RF interface 104, the SRAM 106, and the FLASH ROM 105) and either type of host (e.g., PCMCIA or AT) via the host interface 103.

The configuration of the ASIC/FPGA 101 when operating with a PCMCIA host or an AT host will now be described in detail.

When the host computer 110 is a PCMCIA system, the host interface 103 is, for example, a 68-pin PCMCIA interface divided into 26 address pins, 16 data pins, 2 5V power pins, 4 ground pins, 2 programmable power pins (e.g., 12V), 10 control pins, 7 status pins, an 1 unused pin (reserved for future use).

There are a total of 26 address lines available in the PCMCIA interface that enable up to 64M bytes of memory. According to one embodiment of the present invention, the adapter uses only 13 address lines (A0 to A12). A window of 4K located in the common memory at the base address 0000 is mapped to the local SRAM 106 and FLASH ROM 105 memory area. The 4K window is comprised of a 2K common window and a 2K page window. The 2K common window always maps to the lowest 2K of the SRAM 106, and the 2K page window maps to any 2K memory space of the lower 512K of addressable space. Page selection is accomplished by programming the page register 206.

There is an additional 64M byte address space for the PCMCIA attribute memory which is enabled by a signal (REG/). The attribute memory is divided into three areas, a card information structure (CIS) (a description of the card's specifications and capabilities), card configuration registers 208 (COR and CSR which allow the system to configure the PCMCIA card), and a reserved area (not yet specified).

The PCMCIA card supports access to 4K of the CIS plus the two card configuration registers 208 which reside at base memory address 0000 and 1000 on even boundaries of the attribute memory space respectively. Moreover, the PCMCIA card implements seven registers in the 64M bytes of I/O address space.

The PCMCIA card uses a 13-bit address bus capable of addressing up to 8K bytes of data. The PCMCIA address bus can address I/O registers including the control registers 211, the page register 206, the memory select register 212, the mode registers 207, and the configuration registers 208 (COR and CSR). The PCMCIA address bus can also access attribute memories CIS (within FLASH ROM 105) and the configuration registers 208, and the common memories (common window and common page).

Figure 11:
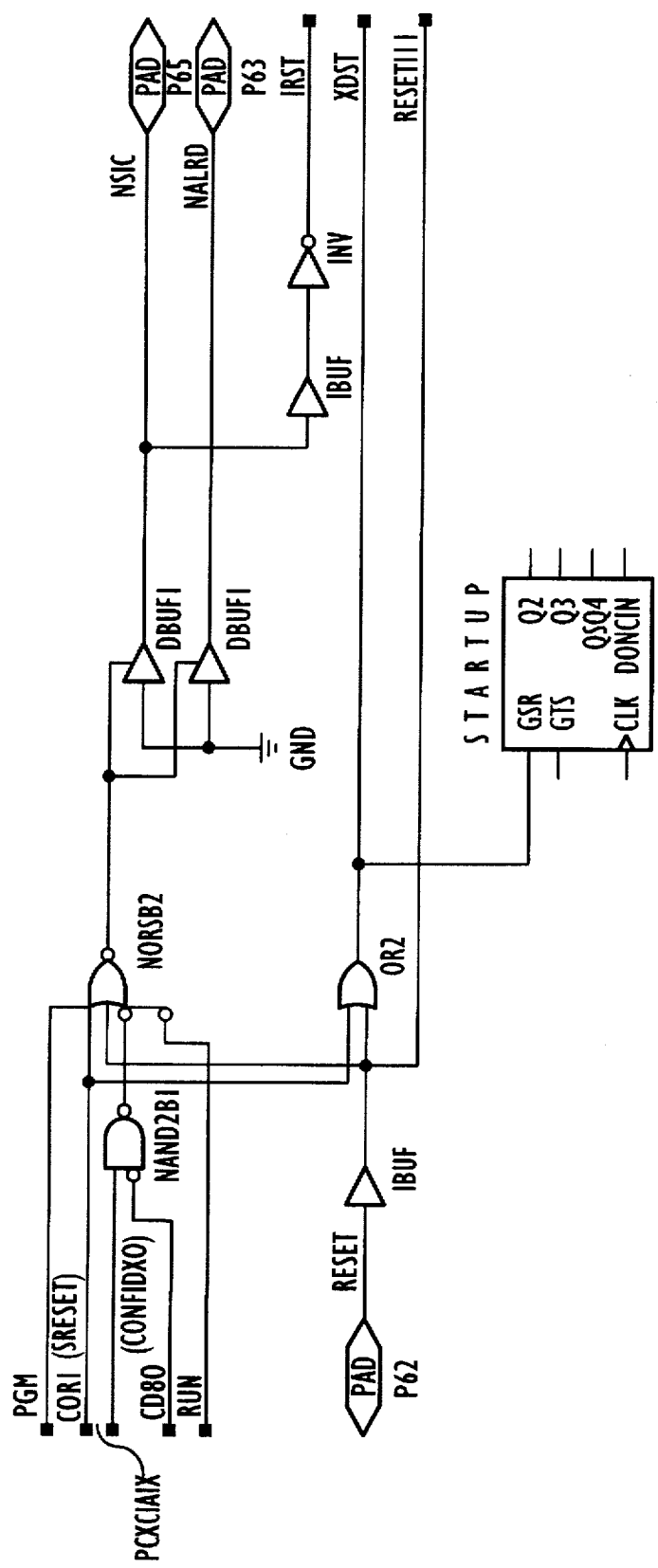
FIG. 11 provides a schematic of the reset circuit used in the ASIC/FPGA according to the present invention.

The signals on the PCMCIA card host interface are listed and described in the chart shown in FIG. 11.

The configuration registers 208 which form part of the PCMCIA attribute memory include a configuration option register (COR) and a card configuration and status register (CSR)(not shown). The COR is used to configure the PCMCIA card and to issue a soft reset to the card. According to various embodiments of the present invention, this register is the first register that must be accessed from the host using attribute memory access at power-up. The COR resides in both attribute memory space and I/O space. The CSR contains information about the condition of the PCMCIA card.

A mode register 207 provides a mechanism to program or reprogram the FLASH ROM device where the firmware codes, network address, node ID and CIS reside. The mode register consists of a write register and a read register. Writing to the write register impacts certain bits in the read register depending on the value written. The value which impacts bits in the read register is the "keyword".

For example, in order to prevent erroneous access to the FLASH ROM, the host must follow a predefined sequence for programming the FLASH ROM. This predefined sequence is referred to as an arming sequence. The FLASH ROM can only be programmed by writing the keywords into the mode register 207 following the arming sequence.

When the host computer 110 is an AT system, the AT/Host interface takes place through a standard ISA bus. Both 8-bit and 16-bit ISA bus options may be used with the AT card. The 16-bit ISA bus supports 24 address lines, defining an address space of 16M bytes. Within the first 1M byte, the first 640K bytes are reserved for system memory. In addition to the conventional 640K bytes, 384K bytes are assigned for bus memory resources. A window of 4K with a programmable base address is mapped to the local SRAM 106 and FLASH ROM 105 memory areas. In addition, the AT card implements 7 registers in the 1K of I/O address space.

The host computer's ISA bus can access I/O registers including the control registers 211, the page register 206, the memory select register 212, the mode registers 207, and the PCMCIA configuration registers (COR and CSR); and the memory mapped 2K common window and the 2K page window.

The signals on the AT card host interface are listed and described in the chart shown in FIG. 12.

When the ASIC/FPGA 101 according to the present invention interfaces with an AT host, operation of the control registers 211, the page register 206, the memory select register 212, the mode register 207, and the COR within configuration registers 208 is the same as described above with reference to the PCMCIA card. The additional registers used for interfacing with a PCMCIA host (mentioned above) are not used when the controller 100 interfaces with an AT host 110.

The following figures provide schematic diagrams of various features of the ASIC/FPGA according to embodiments of the present invention.

Figure 3:
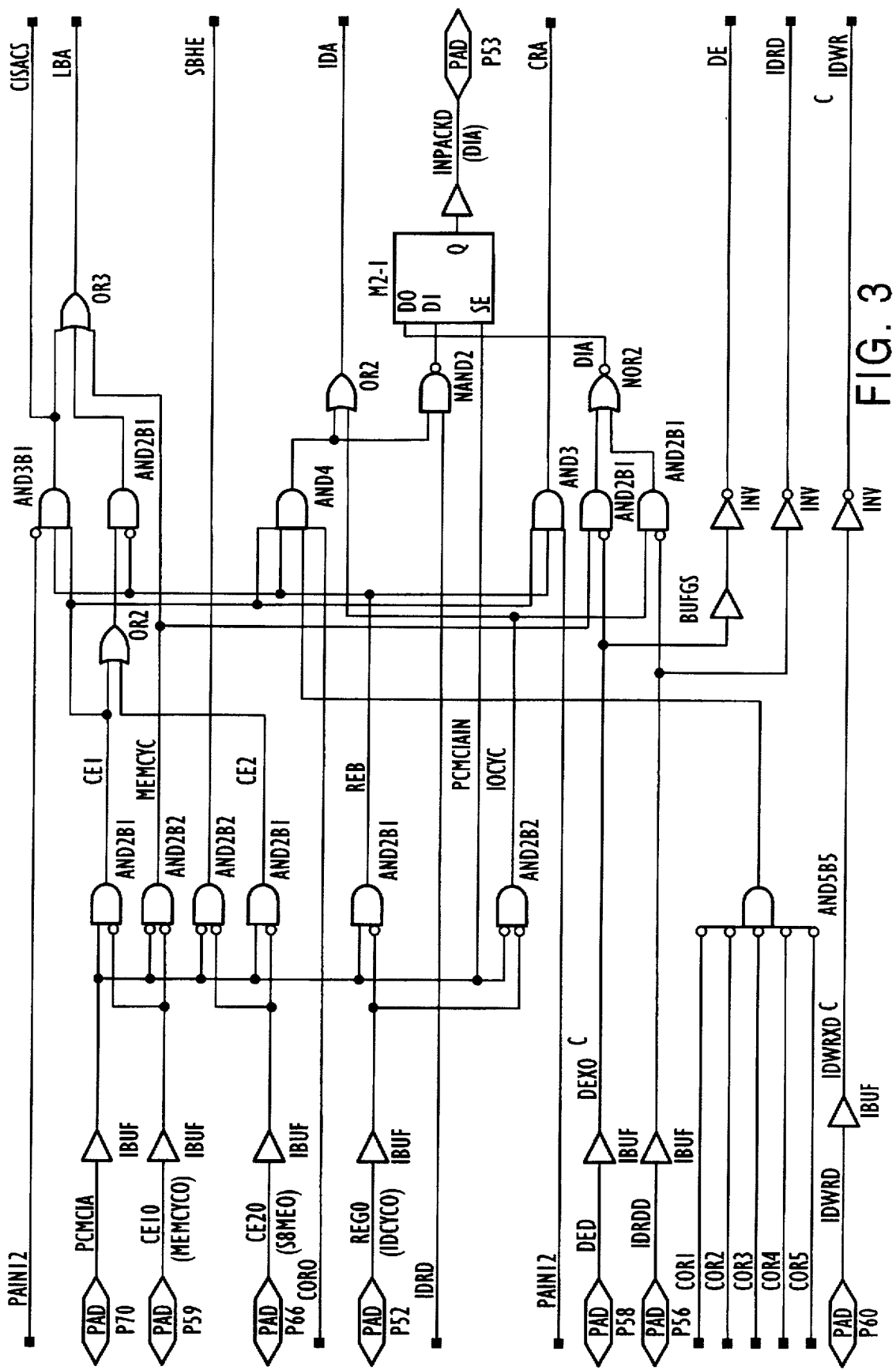
FIG. 3 provides a circuit schematic of the host decode circuit of the ASIC/FPGA according to the present invention.
Figure 4:
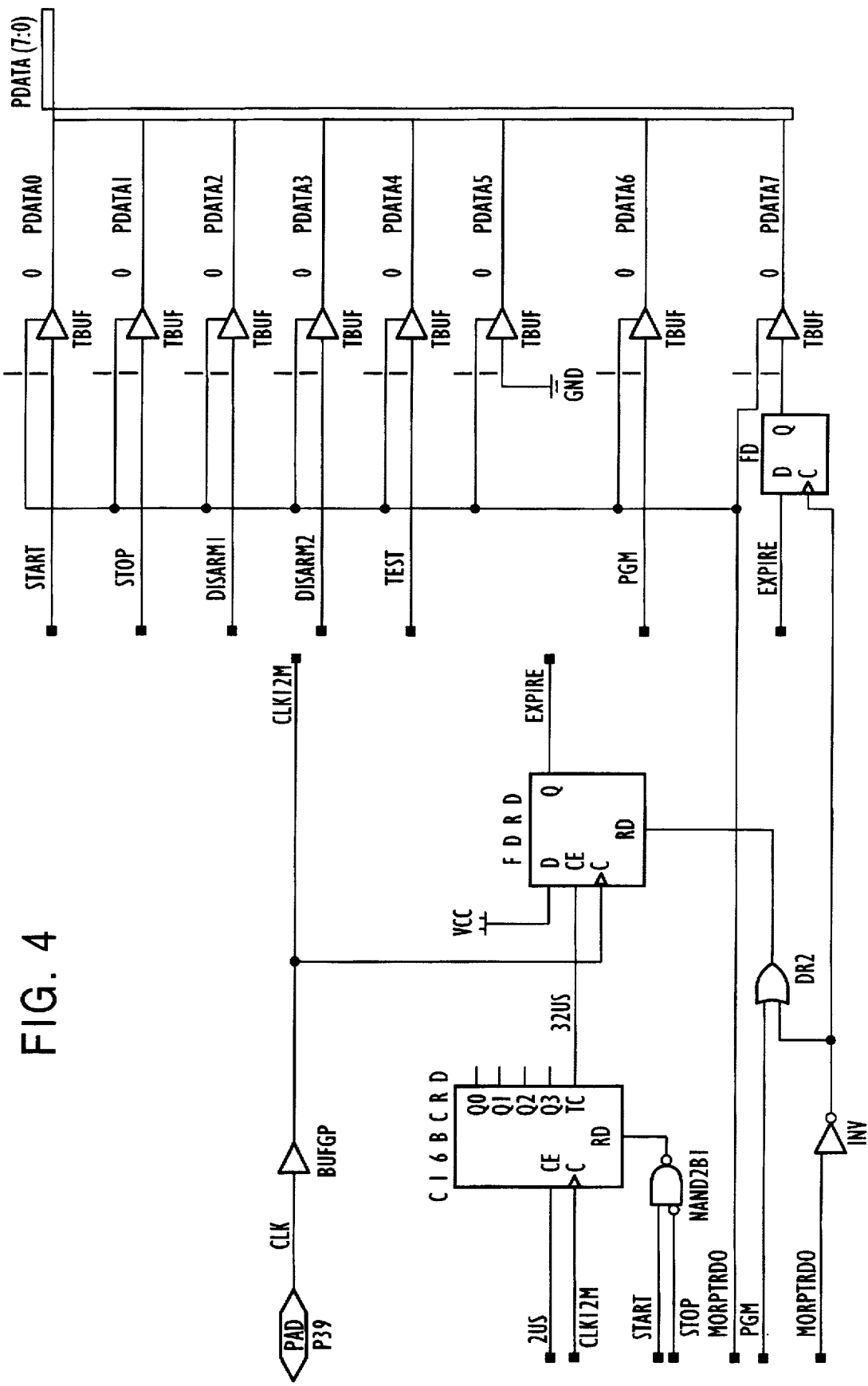
FIG. 4 provides a circuit schematic of the first part of the mode register in the ASIC/FPGA according to the present invention.
Figure 5A:
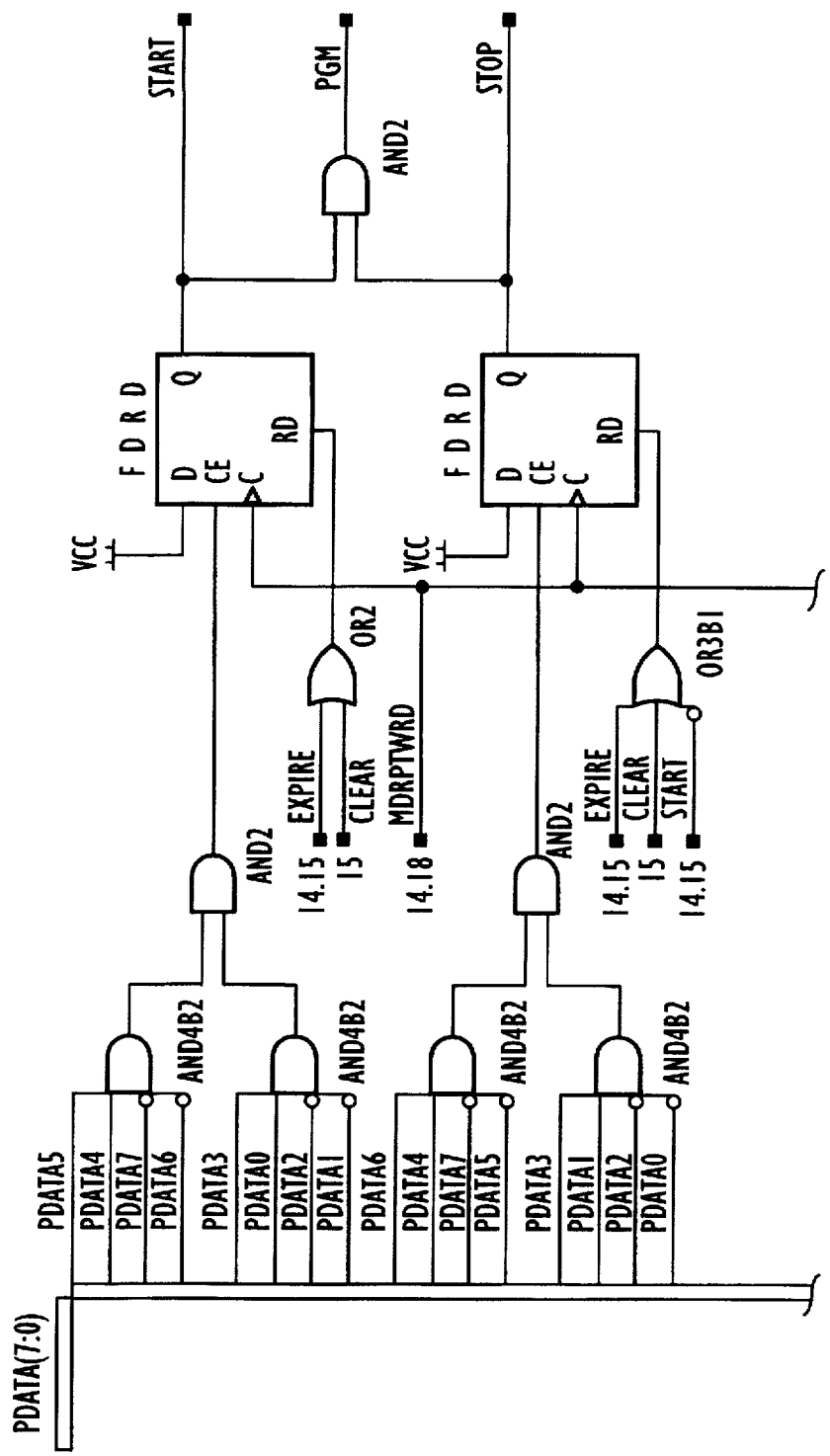
FIG. 5 provides a circuit schematic of the second part of the mode register used in the ASIC/FPGA according to the present invention.
Figure 5B:
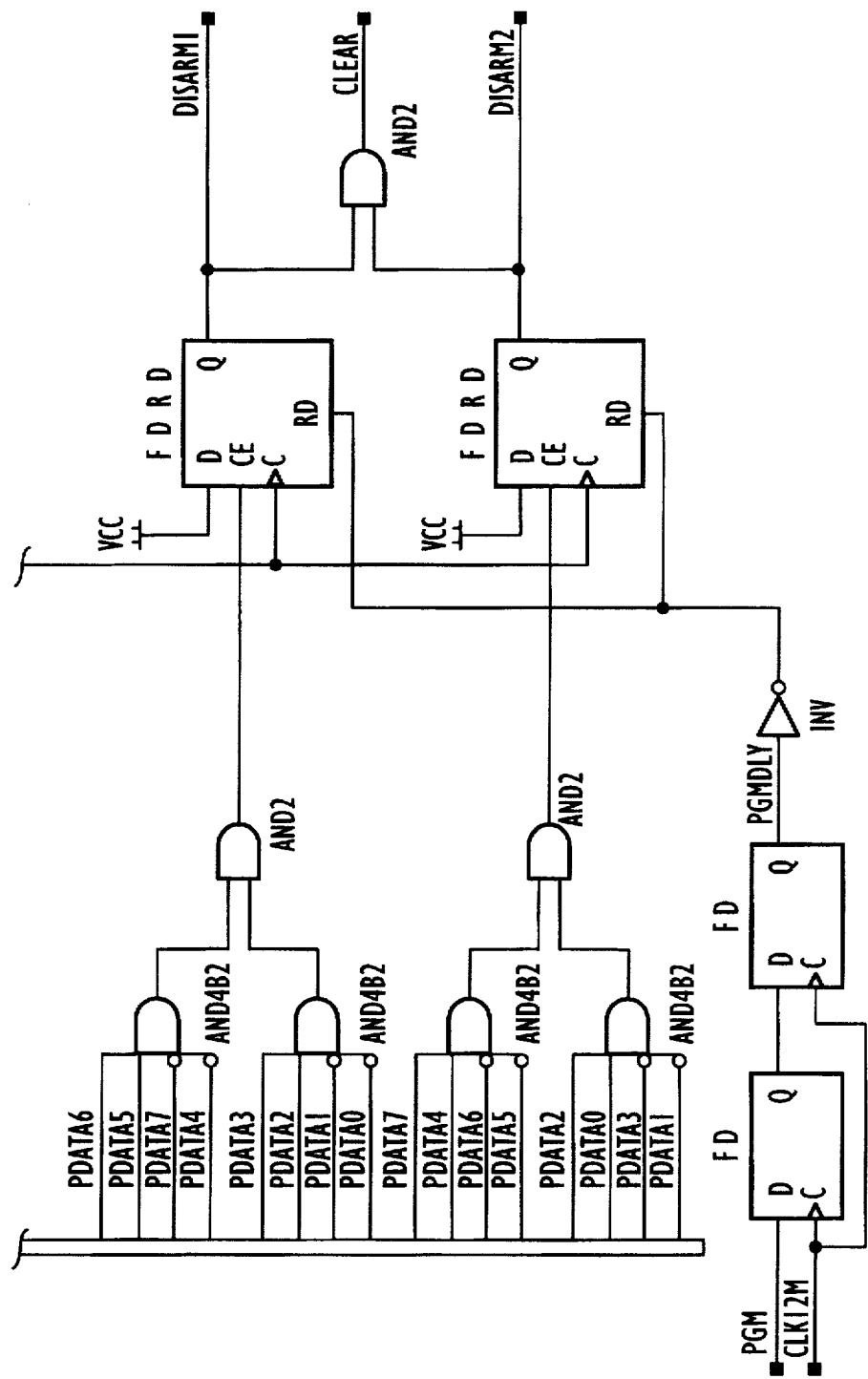

FIG. 3 provides a schematic diagram of the host decode circuit 204 used in the ASIC/FPGA 101 according to the present invention. FIGS. 4 and 5 provide a schematic diagram of the mode register 207 in the ASIC/FPGA 101.

FIG. 6 provides a schematic of a first part of the timing control circuit within control module 201 and bus request module 202, and a first part of the bus request circuit in the bus request module 202, both within ASIC/FPGA 101.

Figure 7:
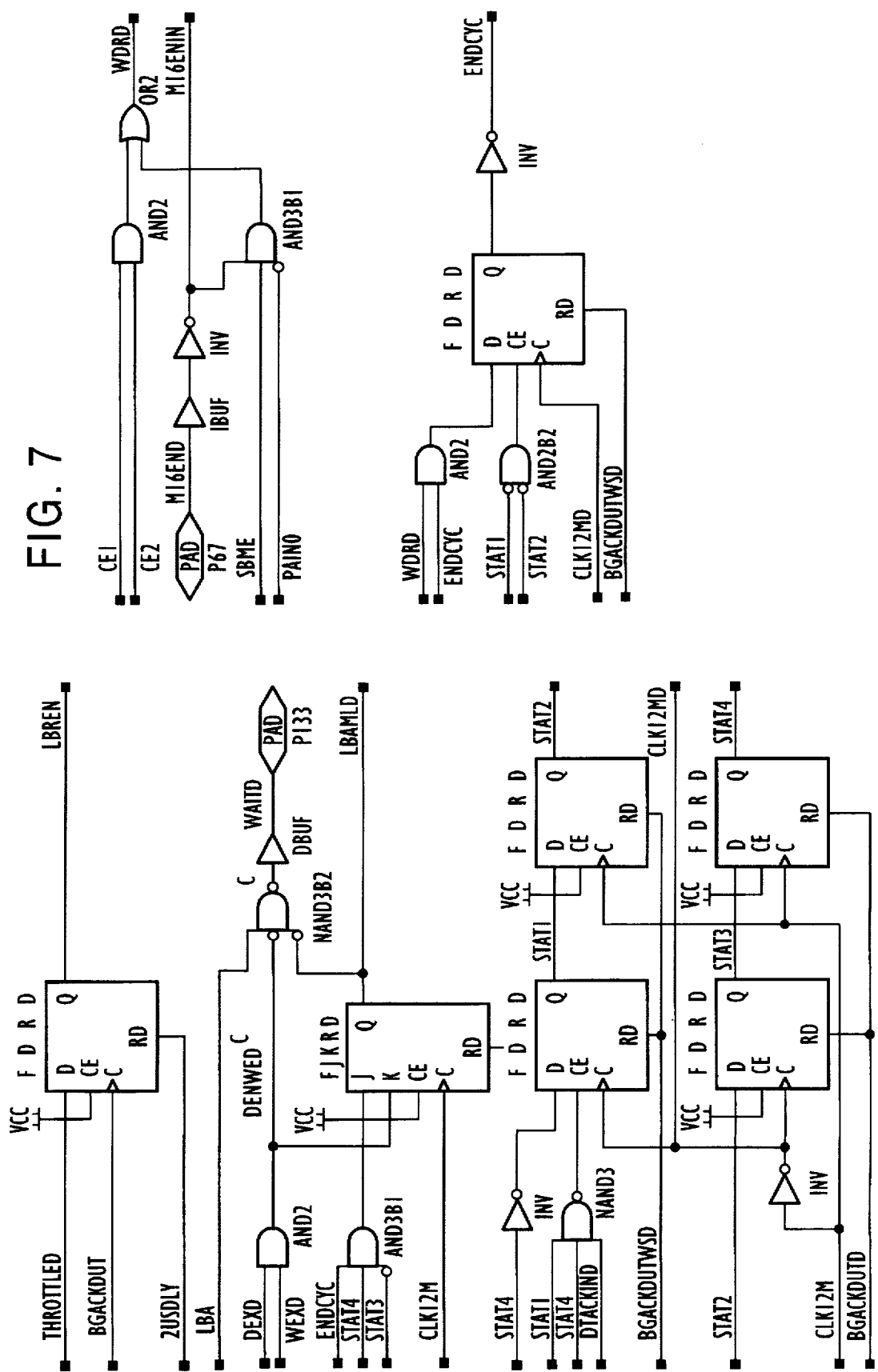
FIG. 7 provides a circuit schematic of a first part of the throttle circuit and a second part of the timing control circuit of the ASIC/FPGA according to the present invention.

FIG. 7 provides a schematic of a second part of the timing control circuit within control module 201 and bus request module 202, and a first part of the throttle circuit within the bus request module 202, both within ASIC/FPGA 101.

Figure 8:
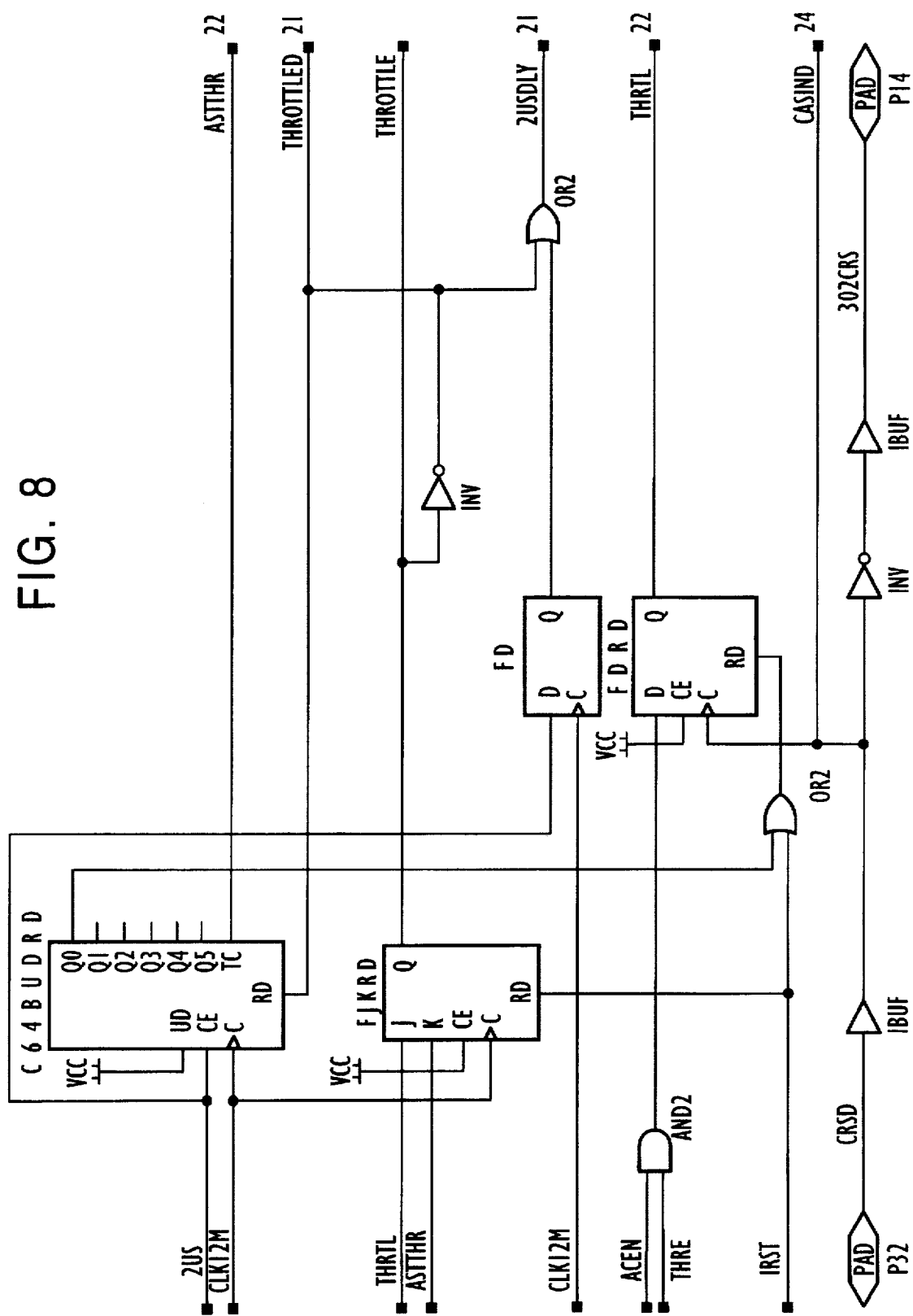
FIG. 8 provides a circuit schematic of a second part of the throttle circuit in the ASIC/FPGA according to the present invention.

FIG. 8 provides a schematic of a second part of the throttle circuit within the bus request module 202 of ASIC/FPGA 101 according to the present invention.

Figure 9:
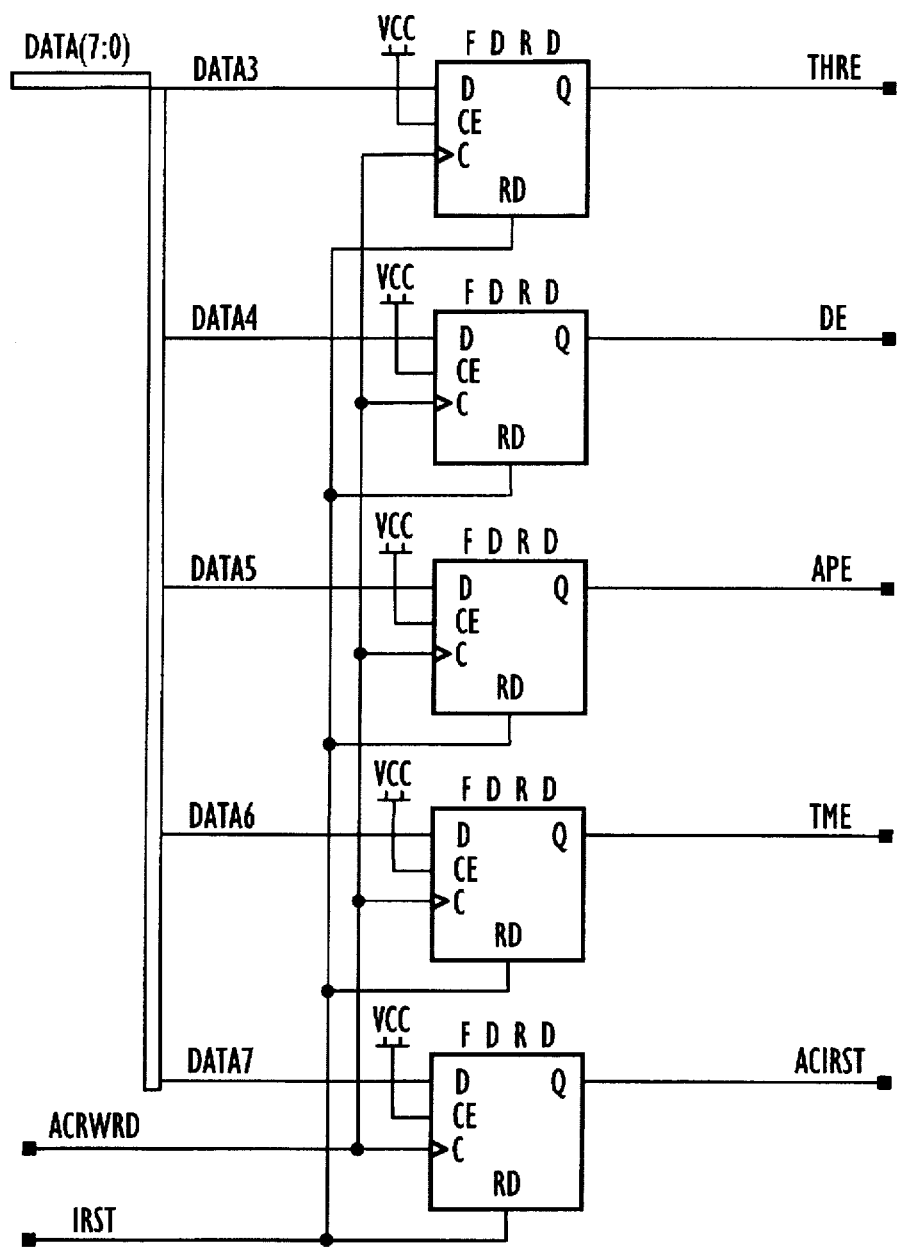
FIG. 9 provides a circuit schematic of a second part of the address compare register and a third part of the throttle circuit used in the ASIC/FPGA according to the present invention.

FIG. 9 provides a schematic of a second part of the address compare register and a third part of the throttle circuit within address compare module 215 of ASIC/FPGA 101.

Figure 10:
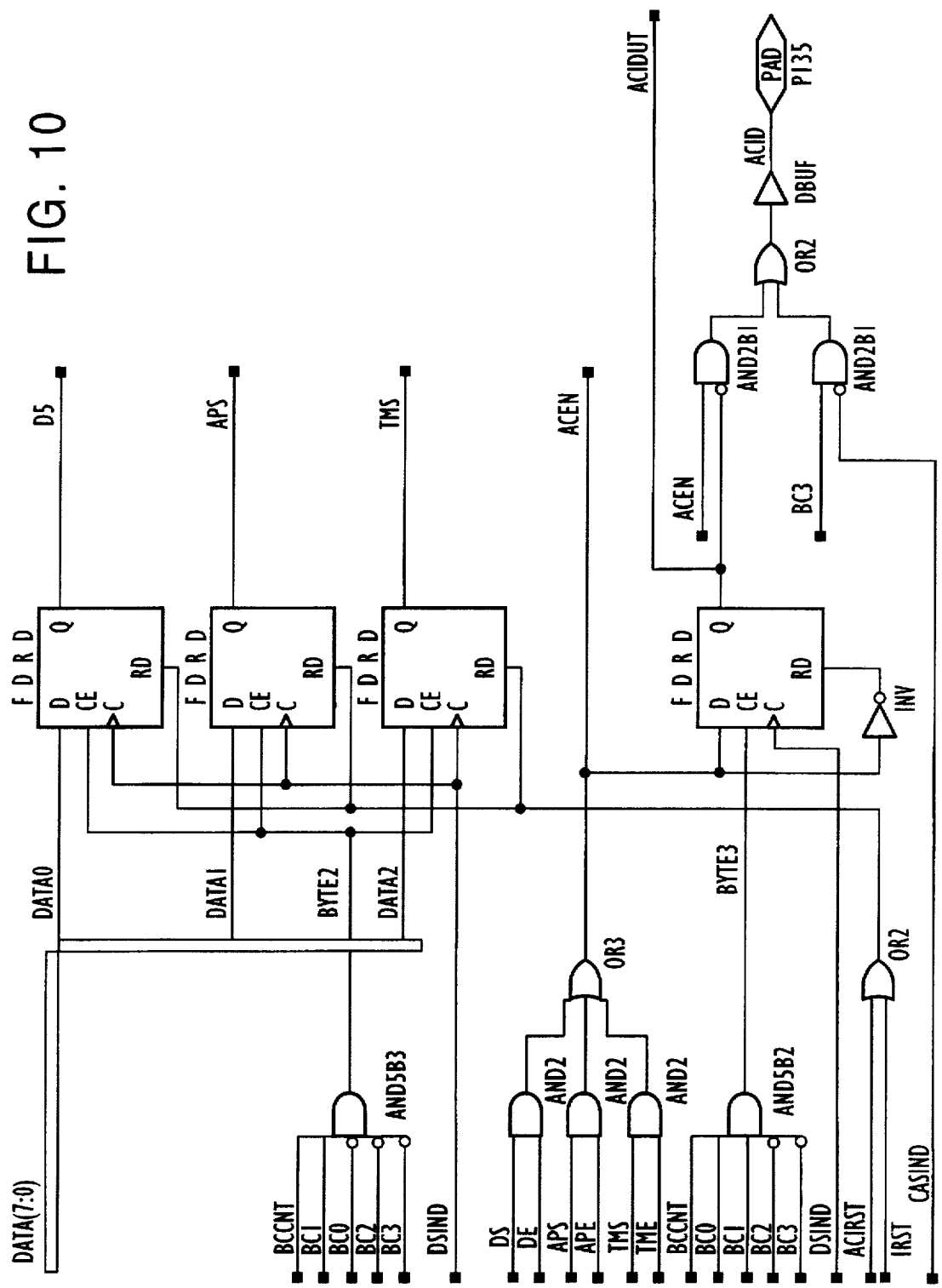
FIG. 10 provides a schematic of a first part of the address compare register used in the ASIC/FPGA according to the present invention.

FIG. 10 provides a schematic of a first part of the address compare register 215 of the ASIC/FPGA 101 according to the present invention.

FIG. 11 provides a schematic of the reset circuit 218 of the ASIC/FPGA 101 according to the present invention.

Various embodiments of other components of the controller 100 will now be described.

The SRAM 106 is, for example, a low profile 128K×8 bits CMOS SRAM in which firmware and software applications may be stored, for example, a TC 551001APL memory device manufactured by Toshiba America Electronic Components, Inc., of Sunnyvale, California. However, other appropriate memory devices may be used without departing from the scope of the present invention. The FLASH ROM 105 is, for example, a low profile 128K×8 bit CMOS FLASH ROM, in which 96K is reserved for program code, 4K for PCMCIA Card Information Structure (CIS) data, and 4K for storage of configuration and identification related information. An Advanced Micro Devices, Inc., of Sunnyvale, Calif. model AM 29F010 sector erase CMOS FLASH memory may be used.

The local processor 102 has a 24-bit address bus capable of addressing up to 16M bytes of data. The local processor 102 may read data from the FLASH ROM 105, read/write data to the SRAM 106, access its internal registers, access registers within the ASIC-FPGA 101, and access registers within RF interface 104.

The local processor 102 is, for example, an MC68302 microprocessor from Motorolla of Schaumburg, Ill. Among the features of this microprocessor are three independent, full duplex serial communication controllers (SCCs), and SCP for synchronous communication, and two serial management controllers (SMCs) to support IDL and GCI auxiliary channels.

The controller 100 according to the present invention communicates with the RF communication module 120, for example, an NCR PCMCIA 915 RF Modem, through a serial modem management interface (MMI).

The RF interface 104 design consists of three sub-interfaces: a modem management interface (MMI) shown in FIG. 2 as serial interface 214, a Carrier Sense Multiple Access with Collision Avoidance (CSMA/CA) interface, and a power supply/control interface.

The MMI is for the firmware to issue the commands to the RF communication module 120 and to receive the status from the module. Since both command and status are serialized before transmission, this serial interface minimizes the number of signals and therefore pins that is required for the interface as it requires only 3 pins.

The CSMA/CA interface consists of eight signals: a pair of signals for transmitting data and receiving data with associated clocks, plus four modem control, and status signals.

There are a total of 64 8-bit registers that can be accessed using a data frame which is 16 bits in length and is shifted across the RF interface pin MMI—SIO using the shift clock MMICLK for both read and write register accesses. The data frame is divided into two parts. The first part consists of one R/W status bit, 6 address bits, and a gap bit, all 8 of which are serially shifted from the controller 100 to the RF communication module 120 with the R/W bit shifted out first. The second part consists of an 8-bit data field shifted either from the controller 100 or from the RF communication module 120 depending on the status of the R/W bit. The gap bit is always set to 1, and its purpose is to allow for hardware switching time. All 64 registers are memory mapped into the memory map of the local processor.

In order to comply with the MMI data frame structure, a number of shift registers are used to provide parallel to serial and serial to parallel conversions.

The RF interface 103 between the controller 100 and the RF communication module 120 is through either a 34-pin or a 15-pin cable. The 34-pin connection is used when the controller is an AT card, and the 15-pin cable is used when the controller 100 is a PCMCIA card. However, the AT design may also be adapted to use the 15-pin configuration used by the PCMCIA card. The power supply/control interface has two configurations depending on whether a 15-pin or a 34-pin RF communication module is used. The 15-pin RF communication module requires a single 5V power supply and supports power-down control signals. The 34-pin RF communication module requires a 5V power supply, +12V and −12V power supplies, and does not support power-down control signals.

The signal interface between the RF interface and the ASIC/FPGA 101 is shown in the chart of FIG. 13.

In another embodiment of the wireless local area network controller according to the present invention, the local processor 102 and the ASIC/FPGA 101 are located within a single ASIC/FPGA, such that all functions of both the local processor 102 and ASIC/FPGA 101 as described above are performed by a single ASIC/FPGA.

In addition, it is contemplated that the various functions of the ASIC/FPGA 101 could be accomplished using software, and/or a combination of hardware and software. Any presently available or future developed software language (or hardware implementation other than ASICs) can be employed in such embodiments of the present invention.

Figure 15:
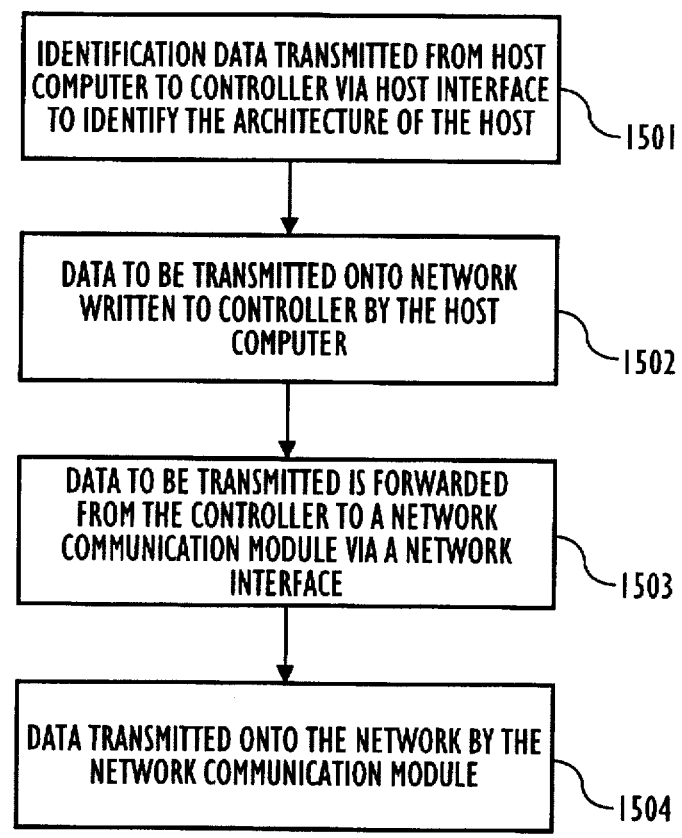
FIG. 15 illustrates a method contemplated by embodiments of the present invention.

As shown in FIG. 15, a method of enabling communication between a host computer 110 having a desktop or a portable architecture and a local area network via a controller 100 according to the present invention includes the steps of transmitting identification data from a host computer via a host interface to a controller, the identification data identifying the architecture of the host computer, and thereby configuring the controller (1501); writing data to be transmitted from the host computer onto a network to the controller (1502); forwarding the data to be transmitted from the controller to a network communication module via a network interface (1503); and transmitting the data to be transmitted onto the network (1504).

While the present invention has been particularly described with reference to the preferred embodiments, it should be readily apparent to those of ordinary skill in the art that changes and modifications in form and details may be made without departing from the spirit and scope of the invention. It is intended that the appended claims contemplate such changes and modifications.

We claim:

1. A local area network controller, comprising:
   a host interface for interfacing with a host computer having a desktop or a portable computer architecture;
   a network interface for interfacing with a network communication module;
   at least one memory;
   a local processor; and
   communication means for enabling communication between said host interface, said network interface, and said local processor, wherein said communication means comprises
   first means for communicating with said network communication module via said network interface,
   second means for communicating with said local processor, and
   interpretation means for receiving and interpreting information from said host computer via said host interface so as to determine when said host computer has a desktop architecture or a portable architecture, wherein said communication means further comprises means for enabling said local processor to have greater access to said at least one memory device than said host computer in response to a control signal.

2. A local area network controller according to claim 1, wherein said network communication module is a wireless network communication module for use in a wireless local area network.

3. A local area network controller according to claim 1, wherein said desktop computer architecture is an ISA architecture.

4. A local area network controller according to claim 1, wherein said portable computer architecture is a PCMCIA architecture.

5. A local area network controller according to claim 1, wherein the control signal is a throttle signal generated by said first communication means.

6. An integrated circuit for use in a local area network controller, comprising:
   first means for receiving control signals and/or data from a host computer having a desktop computer architecture via a host interface;
   second means for receiving control signals and/or data from a host computer having a portable computer architecture via said host interface;
   third means for transmitting control signals and/or data to said host computer via said host interface;
   fourth means for receiving control signals and/or data from a network communication module via a module interface;
   fifth means for transmitting control signals and/or data to said network communication module via said module interface;
   sixth means for receiving control signals and/or data from a local processor;
   seventh means for transmitting control signals and/or data to said local processor; and
   means for enabling said local processor to have greater access to a memory within said controller than host computer in response to a control signal.

7. An integrated circuit according to claim 6, wherein said network communication module is a wireless network communication module for use with a wireless local area network.

8. An integrated circuit according to claim 6, wherein said desktop computer architecture is an ISA architecture.

9. An integrated circuit according to claim 6, wherein said portable computer architecture is a PCMCIA architecture.

10. An integrated circuit according to claim 6, wherein the control signal is throttle signal generated by said fourth means.

11. An integrated circuit for use in a local area network controller, comprising:
    first means for receiving control signals and/or data from a host computer via a host interface;
    second means for transmitting control signals and/or data to said host computer via said host interface;
    third means for receiving control signals and/or data from a network communication module via a module interface;
    fourth means for transmitting control signals and/or data to said network communication module via said module interface;
    fifth means for receiving control signals and/or data from a local processor;
    sixth means for transmitting control signals and/or data to said local processor; and
    seventh means for enabling said local processor to have greater access to a memory within said controller than said host computer in response to a throttle signal generated by said third means.

12. A local area network controller, comprising:
    a host interface for interfacing with a host computer having a desktop or a portable computer architecture;
    a network interface for interfacing with a network communication network; and
    communication means for enabling communication between said host computer and said network interface, wherein said communication means comprises
    a local processor,
    at least one memory,
    means for communicating with said network communication module via said network interface, and
    interpretation means for receiving and interpreting information from said host computer via said host interface so as to determine when said host computer has a desktop architecture or a portable architecture, wherein said communication means further comprises means for enabling said local processor to have greater access to said at least one memory device than said host computer in response to a signal generated by said communication means.

13. A local area network controller according to claim 12, wherein said desktop computer architecture is an ISA architecture.

14. A local area network controller according to claim 12, wherein said portable computer architecture is a PCMCIA architecture.

15. An integrated circuit for use in a local area network controller, comprising:
    a circuit for receiving control signals and/or data from a host computer having a desktop computer architecture via a host interface;
    a circuit for receiving control signals and/or data from a host computer having a portable computer architecture via said host interface;

a circuit for transmitting control signals and/or data to said host computer via said host interface;

a circuit for receiving control signals and/or data from a network communication module via a module interface;

a circuit for transmitting control signals and/or data to said network communication module via said module interface;

a circuit for receiving control signals and/or data from a local processor;

a circuit for transmitting control signals and/or data to said local processor; and, a circuit for storing control signals and/or data, wherein a ratio of access to said circuit for storing control signals and/or data between said host computer and said local processor is determined by a control signal.

16. A method of enabling communication between a host computer having a desktop or a portable architecture and a local area network via a controller, comprising the steps of:

transmitting identification data from a host computer via a host interface to a controller, said identification data identifying the architecture of said host computer, and thereby configuring said controller;

controlling a ratio of access between said host computer and said controller to a memory in said controller in response to a signal;

writing data to be transmitted from said host computer onto a network to said controller;

forwarding said data to be transmitted from said controller to a network communication module via a network interface; and transmitting said data to be transmitted onto said network.

17. A method according to claim 16, wherein the architecture of said host computer is an ISA architecture.

18. A method according to claim 16, wherein the architecture of said host computer is a PCMCIA architecture.

19. An integrated circuit for use in a local area network controller, comprising:

a host receiving circuit for receiving control signals and/or data from a host computer via a host interface;

a host transmitting circuit for transmitting control signals and/or data to said host computer via said host interface;

a network receiving circuit for receiving control signals and/or data from a network communication module via a module interface;

a network transmitting circuit for transmitting control signals and/or data to said network communication module via said module interface;

a local receiving circuit for receiving control signals and/or data from a local processor;

a local transmitting circuit for transmitting control signals and/or data to said local processor; and a memory access circuit for enabling said local processor to have greater access to a memory within said controller than said host computer in response to a control signal.

20. A network interface device comprising:

a first interface connected to a local area network;

a second interface connected to a host computer;

a local processor coordinating the transfer of information between said first interface and said second interface, a bus interconnecting said first interface, said second interface, and said local processor;

a bus controller for controlling access by said local processor and said host computer to said bus in response to a signal, said signal generated when an address of received information from said first interface matches an address of said host computer.

21. A network interface device according to claim 20, wherein said signal is a throttle signal.

22. A network interface device according to claim 20, wherein, in response to said signal, said bus controller allocates said local processor more access to said bus than said host processor.

23. A network interface device according to claim 22, wherein, with no signal, a ratio of access between said local processor and said host computer to said bus is 1:1 and, with said signal, a ratio of access between said local processor and said host computer is 4:1.

24. A network interface device according to claim 20, wherein, in response to said signal, said local processor communicates with said first interface at a greater rate than the communication rate between said host computer and said first interface.

25. A network interface device according to claim 20, further comprising a local memory, wherein access to said local memory is controlled in accordance with said signal.

26. A method of enabling communication between a host computer and a local area network via a controller, comprising the steps of:

receiving information over said local area network;

generating a signal in response to the receipt of said information;

controlling a ratio of access between said host computer and said controller to a memory in said controller in response to said signal;

writing to a memory in said controller the information from said local area network;

transmitting the information to said host computer.

27. A method of enabling communication according to claim 26, wherein said controlling step limits the number of read/write cycles available to said host computer when said signal is active.

28. A local area network controller, comprising:

a host interface for interfacing with a host computer having a desktop or a portable computer architecture;

a network interface for interfacing with a network communication network; and a communication device for enabling communication between said host computer and said network interface, wherein said communication device comprises a local processor, at least one memory, a communication circuit for communicating with said network communication module via said network interface, and an interpretation device for receiving and interpreting information from said host computer via said host interface so as to determine when said host computer has a desktop architecture or a portable architecture, wherein said communication device further comprises an enabling circuit for enabling said local processor to have greater access to said at least one memory device than said host computer in response to a control signal.

* * * * *